(12) United States Patent
Hsiao et al.

(10) Patent No.: US 9,323,086 B2
(45) Date of Patent: Apr. 26, 2016

(54) CURVED LIQUID CRYSTAL DISPLAY DEVICE

(71) Applicant: Shenzhen China Star Optoelectronics Technology Co., Ltd., Shenzhen, Guangdong (CN)

(72) Inventors: Yuchun Hsiao, Shenzhen (CN); Gang Yu, Shenzhen (CN); Jiaxin Li, Shenzhen (CN); Quan Li, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 91 days.

(21) Appl. No.: 14/356,596

(22) PCT Filed: Apr. 3, 2014

(86) PCT No.: PCT/CN2014/074762
§ 371 (c)(1),
(2) Date: May 6, 2014

(87) PCT Pub. No.: WO2015/139342
PCT Pub. Date: Sep. 24, 2015

(65) Prior Publication Data
US 2015/0268507 A1 Sep. 24, 2015

(30) Foreign Application Priority Data
Mar. 21, 2014 (CN) .......................... 2014 1 0110977

(51) Int. Cl.
*G02F 1/1333* (2006.01)
(52) U.S. Cl.
CPC .... *G02F 1/133308* (2013.01); *G02F 1/133382* (2013.01); *G02F 2001/13332* (2013.01)

(58) Field of Classification Search
CPC ................ G02F 2001/13332; G02F 1/133308; G02F 2001/133314; G02F 2001/133317; G02F 2201/465
See application file for complete search history.

(56) References Cited

U.S. PATENT DOCUMENTS

| 2014/0085779 A1* | 3/2014 | Delva ................ G02F 1/133308 361/679.01 |
| 2014/0125913 A1* | 5/2014 | Lee .................... G02F 1/133615 349/58 |
| 2014/0254192 A1* | 9/2014 | Do ........................ G02B 6/0051 362/606 |

* cited by examiner

*Primary Examiner* — Richard Kim
*Assistant Examiner* — Kendrick Hsu
(74) *Attorney, Agent, or Firm* — Andrew C. Cheng

(57) ABSTRACT

The present invention provides a curved liquid crystal display device, which includes: a backlight module (2), a mold frame (4), a liquid crystal display panel (6), and a front bezel (8). The backlight module (2) includes a backplane (22), a curved light guide plate (24) arranged in the backplane (22), a backlight source (26) arranged in the backplane (22), and a heat dissipation board (28) receiving the backlight source (26) mounted thereto. The heat dissipation board (28) includes a bracket section (282) and a mount section (284) connected, in an inclined manner, to the bracket section (282). The bracket section (282) is mounted to the backplane (22). The backlight source (26) is mounted to the mount section (284). The front bezel (8) includes a front plate (82) and a side plate (84) connected to the front plate (82). The mount section (284) includes a mounting tab (286) extending therefrom toward the side plate (84). The mounting tab (286) is coupled to the side plate (84) so as to couple the front bezel (8) and the heat dissipation board (28) together.

15 Claims, 2 Drawing Sheets

CURVED LIQUID CRYSTAL DISPLAY DEVICE

BACKGROUND OF THE INVENTION

1. Field of the Invention

The present invention relates to the field of liquid crystal displaying, and in particular to a curved liquid crystal display device.

2. The Related Arts

Liquid crystal displays (LCDs) have a variety of advantages, such as thin device body, low power consumption, and being free of radiation, and are thus of wide applications, such as mobile phones, personal digital assistants (PDAs), digital cameras, computer monitors, and notebook computer screens.

Most of the liquid crystal displays that are currently available in the market are backlighting liquid crystal displays, which comprise an enclosure, a liquid crystal panel arranged in the enclosure, and a backlight module mounted in the enclosure. The structure of a conventional liquid crystal panel is composed of a color filter (CF) substrate, a thin-film transistor (TFT) array substrate, and a liquid crystal layer arranged between the two substrates and the principle of operation is that a driving voltage is applied to the two glass substrates to control rotation of the liquid crystal molecules of the liquid crystal layer in order to refract out light emitting from the backlight module to generate images. Since the liquid crystal panel itself does not emit light, light must be provided from the backlight module in order to normally display images. Thus, the backlight module is one of the key components of the liquid crystal displays. The backlight modules can be classified in two types, namely a side-edge backlight module and a direct backlight module, according to the site where light gets incident. The direct backlight module comprises a light source, such as a cold cathode fluorescent lamp (CCFL) or a light-emitting diode (LED), which is arranged at the backside of the liquid crystal panel to form a planar light source directly supplied to the liquid crystal display panel. The side-edge backlight module comprises an LED light bar, serving as a backlight source, which is arranged at an edge of a backplane to be located rearward of one side of the liquid crystal display panel. The LED light bar emits light that enters a light guide plate (LGP) through a light incident face at one side of the light guide plate and is projected out of a light emergence face of the light guide plate, after being reflected and diffused, to pass through an optic film assembly so as to form a planar light source for the liquid crystal panel.

Recently, major manufacturers have marketed curved liquid crystal display devices one after another. Generally speaking, the curved liquid crystal display devices allow for the best viewing effect from edge to edge, while a regular liquid crystal display device has generally poor capability of displaying at edges of a screen. The curved liquid crystal display devices has a screen that has a curved design showing a surrounding configuration toward a viewer so as to provide a wide full-view image, allowing for the same visual enjoyment at both the central portion or the circumferential portion of the screen and also reducing distortion of off-axis viewing for viewing at a short distance. Further, the curved liquid crystal display device allows a viewer's viewing distance to be extended, achieving better experience of viewing. Thus, compared to the regular liquid crystal display devices, the curved liquid crystal display devices have advantages, including: (1) brand differentiating, (2) wider viewable angle, and (3) reducing distortion for short distance viewing.

Referring to FIG. 1, a conventional curved liquid crystal display device is shown, comprising a backlight module 100, a mold frame 300 mounted on the backlight module 100, a liquid crystal display panel 500 arranged on the mold frame 300, and a front bezel 700 arranged on the liquid crystal display panel 500. The backlight module 100 comprises a light guide plate 102 that is arranged in a curved form. The backlight module 100 comprises a backlight source 104 that is set to correspond to a light incidence surface of the light guide plate 102. This causes a heat dissipation board 106 of the backlight source 104 to be set in an inclined arrangement. To match up with the entire structure of the curved liquid crystal display device, side plates 702 of the front bezel 700 must be arranged substantially vertical. This leads to a large gap 762 (around 1 mm-2 mm) between the side plate 702 and the heat dissipation board 106, which is adverse for bezel slimming of the curved liquid crystal display device.

SUMMARY OF THE INVENTION

An object of the present invention is to provide a curved liquid crystal display device, which has a simple structure and allows for direct mounting of a front bezel to a heat dissipation board so as to help achieve bezel slimming of the curved liquid crystal display device.

To achieve the above object, the present invention provides a curved liquid crystal display device, which comprises: a backlight module, a mold frame mounted on the backlight module, a liquid crystal display panel arranged on the mold frame, and a front bezel arranged on the liquid crystal display panel. The backlight module comprises a backplane, a curved light guide plate arranged in the backplane, a backlight source arranged in the backplane, and a heat dissipation board receiving the backlight source mounted thereon. The heat dissipation board comprises a bracket section and a mount section that is connected, in an inclined manner, to the bracket section. The bracket section is mounted to the backplane. The backlight source is mounted to the mount section. The front bezel comprises a front plate and a side plate connected to the front plate. The mount section comprises a mounting tab extending therefrom toward the side plate. The mounting tab is coupled to the side plate so as to couple the front bezel and the heat dissipation board together.

The side plate comprises a through hole formed therein and the mounting tab of the heat dissipation board comprises a threaded hole formed therein to correspond to the through hole. A screw is received through the through hole to engage the threaded hole so as to fix the front bezel and the heat dissipation board to each other.

The mount section supports the mold frame thereon. The mold frame has an end section positioned against an outer side of the mount section that is opposite to the backlight source and located between the mounting tab and the mount section.

The side plate of the front bezel is arranged to be inclined with respect to the mount section.

The backlight source is mounted to the mount section to correspond to a light incidence surface of the curved light guide plate.

The backlight module further comprises a bottom reflector plate arranged on a bottom surface of the curved light guide plate that faces the backplane and an optical film assembly arranged above the curved light guide plate and located in the mold frame.

The backplane is made of a steel plate.

The steel plate has a thickness of 0.8-1 mm.

The heat dissipation board is made of an aluminum plate.

The present invention also provides a curved liquid crystal display device, which comprises: a backlight module, a mold frame mounted on the backlight module, a liquid crystal display panel arranged on the mold frame, and a front bezel arranged on the liquid crystal display panel, the backlight module comprising a backplane, a curved light guide plate arranged in the backplane, a backlight source arranged in the backplane, and a heat dissipation board receiving the backlight source mounted thereon, the heat dissipation board comprising a bracket section and a mount section that is connected, in an inclined manner, to the bracket section, the bracket section being mounted to the backplane, the backlight source being mounted to the mount section, the front bezel comprising a front plate and a side plate connected to the front plat, the mount section comprising a mounting tab extending therefrom toward the side plate, the mounting tab being coupled to the side plate so as to couple the front bezel and the heat dissipation board together;

wherein the side plate comprises a through hole formed therein and the mounting tab of the heat dissipation board comprises a threaded hole formed therein to correspond to the through hole, a screw being received through the through hole to engage the threaded hole so as to fix the front bezel and the heat dissipation board to each other;

wherein the mount section supports the mold frame thereon;

wherein the mold frame has an end section positioned against an outer side of the mount section that is opposite to the backlight source and located between the mounting tab and the mount section;

wherein the side plate of the front bezel is arranged to be inclined with respect to the mount section; and wherein the backlight source is mounted to the mount section to correspond to a light incidence surface of the curved light guide plate.

The backlight module further comprises a bottom reflector plate arranged on a bottom surface of the curved light guide plate that faces the backplane and an optical film assembly arranged above the curved light guide plate and located in the mold frame.

The backplane is made of a steel plate.

The steel plate has a thickness of 0.8-1 mm.

The heat dissipation board is made of an aluminum plate.

The efficacy of the present invention is that the present invention provides a curved liquid crystal display device, which comprises a mounting tab extending from a heat dissipation board toward a side plate and a front bezel is fixed to the mounting tab to have the front bezel and the heat dissipation board fixed to each other without any arrangement of a side plate of a backplane at the fixing site and effectively shorten the distance between the front bezel and the curved light guide plate to help achieve bezel slimming of the curved liquid crystal display device.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
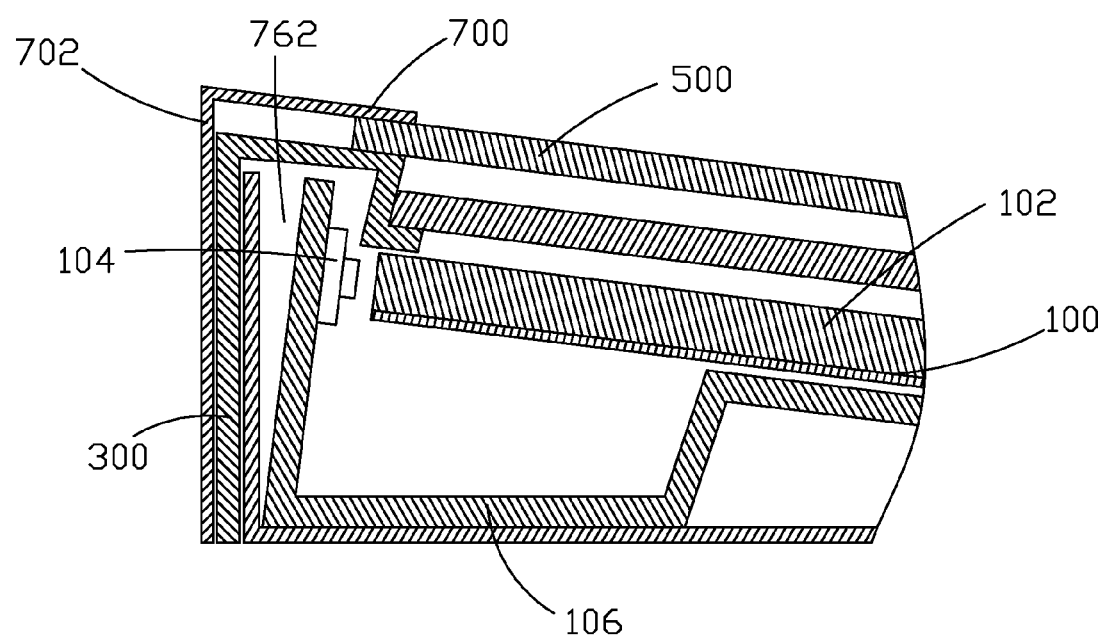
FIG. 1 is a cross-sectional view showing a conventional curved liquid crystal display device.
Figure 2:
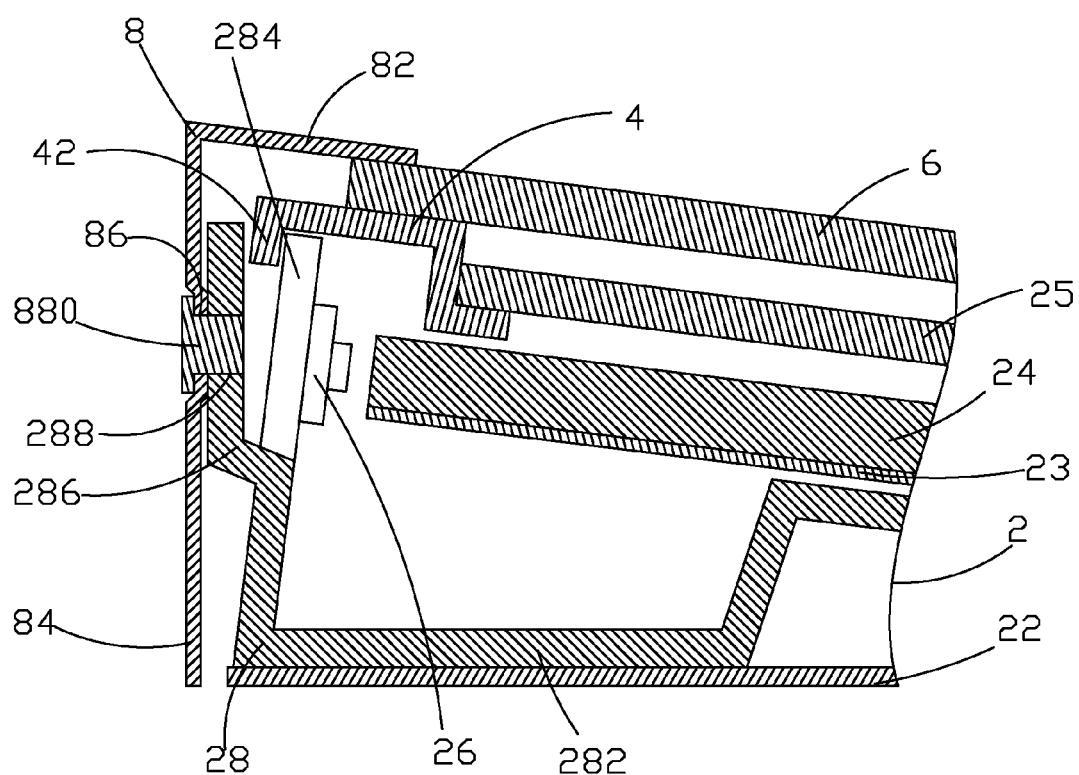
FIG. 2 is a cross-sectional view showing a curved liquid crystal display device according to the present invention.

Referring to FIG. 2, the present invention provides a curved liquid crystal display device, which comprises: a backlight module 2, a mold frame 4 mounted on the backlight module 2, a liquid crystal display panel 6 arranged on the mold frame 4, and a front bezel 8 arranged on the liquid crystal display panel 6. The backlight module 2 provides a planar light source and the mold frame 4 carries and supports the liquid crystal display panel 6 thereon. The liquid crystal display panel 6 functions to display an image. The front bezel 8 retains the liquid crystal display panel 6 on the mold frame 4.

Specifically, the backlight module 2 comprises a backplane 22, a curved light guide plate 24 arranged in the backplane 22, a backlight source 26 arranged in the backplane 22, and a heat dissipation board 28 receiving the backlight source 26 mounted thereon.

The heat dissipation board 28 comprises a bracket section 282 and a mount section 284 that is connected, in an inclined manner, to the bracket section 282. The bracket section 282 is mounted to the backplane 22 and the backlight source 26 is mounted to the mount section 284.

The front bezel 8 comprises a front plate 82 and a side plate 84 connected to the front plate 82. The mount section 284 comprises a mounting tab 286 extending therefrom toward the side plate 84. The mounting tab 286 is coupled to the side plate 82 so as to couple the front bezel 8 and the heat dissipation board 28 together. The side plate 84 of the front bezel 8 is arranged to be inclined with respect to the mount section 284.

In the instant embodiment, the side plate 84 comprises a through hole 86 formed therein. The mounting tab 286 of the heat dissipation board 28 comprises a threaded hole 288 formed therein to correspond to the through hole 86. A screw 880 is set through the through hole 86 to engage the threaded hole 288 so as to fix the front bezel 8 and the heat dissipation board 28 to each other.

The mount section 284 supports the mold frame 4 thereon. The mold frame 4 has an end section 42 positioned against an outer side of the mount section 284 that is opposite to the backlight source 26 and located between the mounting tab 286 and the mount section 284.

The backlight source 26 is mounted to the mount section 284 to correspond to a light incidence surface of the curved light guide plate 24.

The backplane 22 is made of a steel plate having a thickness of 0.8-1 mm.

The heat dissipation board 28 is made of an aluminum plate.

The backlight module 2 further comprises a bottom reflector plate 23 arranged on a bottom surface of the curved light guide plate 24 that faces the backplane 22 and an optical film assembly 25 arranged above the curved light guide plate 24 and located in the mold frame 4.

The mounting tab 286 of the heat dissipation board 28 is directly coupled to the side plate 84 of the front bezel 8 so that a side plate that is required in a conventional backplane can be eliminated thereby shortening the distance between the side plate 84 of the front bezel 8 and the curved light guide plate 24 and reducing the width of the front plate 82 of the front bezel 8 to help achieve bezel slimming of the curved liquid crystal display device. Taking the backplane 22 of the instant embodiment that is made of a steel plate having a thickness of 0.8-1 mm as an example, the width of the front plate 82 of the front bezel 8 can be reduced by 0.8-1 mm.

Further, the mounting tab 286 of the heat dissipation board 28 is directly coupled to the side plate 84 of the front bezel 8 and an end section 42 of the mold frame 4 is positioned against the outer side of the mount section 284 that is opposite to the backlight source 26 and located between the mounting tab 286 and the mount section 284, the distance between the side plate 84 of the front bezel 8 and the curved light guide plate 24 can be further shortened to help achieve bezel slimming of the curved liquid crystal display device.

In summary, the present invention provides a curved liquid crystal display device, which comprises a mounting tab extending from a heat dissipation board toward a side plate and a front bezel is fixed to the mounting tab to have the front bezel and the heat dissipation board fixed to each other without any arrangement of a side plate of a backplane at the fixing site and effectively shorten the distance between the front bezel and the curved light guide plate to help achieve bezel slimming of the curved liquid crystal display device.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A curved liquid crystal display device, comprising: a backlight module, a mold frame mounted on the backlight module, a liquid crystal display panel arranged on the mold frame, and a front bezel arranged on the liquid crystal display panel, the backlight module comprising a backplane, a curved light guide plate arranged in the backplane, a backlight source arranged in the backplane, and a heat dissipation board receiving the backlight source mounted thereon, the heat dissipation board comprising a bracket section and a mount section that is connected, in an inclined manner, to the bracket section, the bracket section being mounted to the backplane, the backlight source being mounted to the mount section, the front bezel comprising a front plate and a side plate connected to the front plate and inclined with respect to the mount section of the heat dissipation board with a gap having a wedge-shaped cross section defined between the side plate and the mount section, the mount section comprising an outside surface facing an inside surface of the side plate of the front bezel and a mounting tab projecting from and spaced from the outside surface and extending toward the side plate to define an end face that is spaced from the outside surface of the mount section and corresponds to and is in contact engagement with the inside surface of the side plate of the front bezel, the mounting tab being coupled to the side plate through the end face in surface contact with the inside surface of the side plate so as to couple the front bezel and the heat dissipation board together.

2. The curved liquid crystal display device as claimed in claim 1, wherein the side plate comprises a through hole formed therein and the mounting tab of the heat dissipation board comprises a threaded hole formed therein to correspond to the through hole, a screw being received through the through hole to engage the threaded hole so as to fix the front bezel and the heat dissipation board to each other.

3. The curved liquid crystal display device as claimed in claim 1, wherein the mount section supports the mold frame thereon.

4. The curved liquid crystal display device as claimed in claim 3, wherein the mold frame has an end section positioned against the outside surface of the mount section that is opposite to the backlight source and located between the mounting tab and another portion of the mount section.

5. The curved liquid crystal display device as claimed in claim 1, wherein the side plate of the front bezel is arranged to be inclined with respect to the mount section.

6. The curved liquid crystal display device as claimed in claim 1, wherein the backlight source is mounted to the mount section to correspond to a light incidence surface of the curved light guide plate.

7. The curved liquid crystal display device as claimed in claim 1, wherein the backlight module comprises a bottom reflector plate arranged on a bottom surface of the curved light guide plate that faces the backplane and an optical film assembly arranged above the curved light guide plate and located in the mold frame.

8. The curved liquid crystal display device as claimed in claim 1, wherein the backplane is made of a steel plate.

9. The curved liquid crystal display device as claimed in claim 8, wherein the steel plate has a thickness of 0.8-1 mm.

10. The curved liquid crystal display device as claimed in claim 1, wherein the heat dissipation board is made of an aluminum plate.

11. A curved liquid crystal display device, comprising: a backlight module, a mold frame mounted on the backlight module, a liquid crystal display panel arranged on the mold frame, and a front bezel arranged on the liquid crystal display panel, the backlight module comprising a backplane, a curved light guide plate arranged in the backplane, a backlight source arranged in the backplane, and a heat dissipation board receiving the backlight source mounted thereon, the heat dissipation board comprising a bracket section and a mount section that is connected, in an inclined manner, to the bracket section, the bracket section being mounted to the backplane, the backlight source being mounted to the mount section, the front bezel comprising a front plate and a side plate connected to the front plate and inclined with respect to the mount section of the heat dissipation board with a gap having a wedge-shaped cross section defined between the side plate and the mount section, the mount section comprising an outside surface facing an inside surface of the side plate of the front bezel and a mounting tab projecting from and spaced from the outside surface and extending toward the side plate to define an end face that is spaced from the outside surface of the mount section and corresponds to and is in contact engagement with the inside surface of the side plate of the front bezel, the mounting tab being coupled to the side plate through the end face in surface contact with the inside surface of the side plate so as to couple the front bezel and the heat dissipation board together;

wherein the side plate comprises a through hole formed therein and the mounting tab of the heat dissipation board comprises a threaded hole formed therein to correspond to the through hole, a screw being received through the through hole to engage the threaded hole so as to fix the front bezel and the heat dissipation board to each other;

wherein the mount section supports the mold frame thereon;

wherein the mold frame has an end section positioned against the outside surface of the mount section that is opposite to the backlight source and located between the mounting tab and another portion of the mount section;

wherein the side plate of the front bezel is arranged to be inclined with respect to the mount section; and wherein the backlight source is mounted to the mount section to correspond to a light incidence surface of the curved light guide plate.

12. The curved liquid crystal display device as claimed in claim 11, wherein the backlight module comprises a bottom reflector plate arranged on a bottom surface of the curved light guide plate that faces the backplane and an optical film assembly arranged above the curved light guide plate and located in the mold frame.

13. The curved liquid crystal display device as claimed in claim 11, wherein the backplane is made of a steel plate.

14. The curved liquid crystal display device as claimed in claim 13, wherein the steel plate has a thickness of 0.8-1 mm.

15. The curved liquid crystal display device as claimed in claim 11, wherein the heat dissipation board is made of an aluminum plate.

\* \* \* \* \*